Aug. 28, 1956 E. OWENS 2,760,897
WEATHER STRIP AND METHOD OF MAKING THE SAME
Filed June 2, 1952
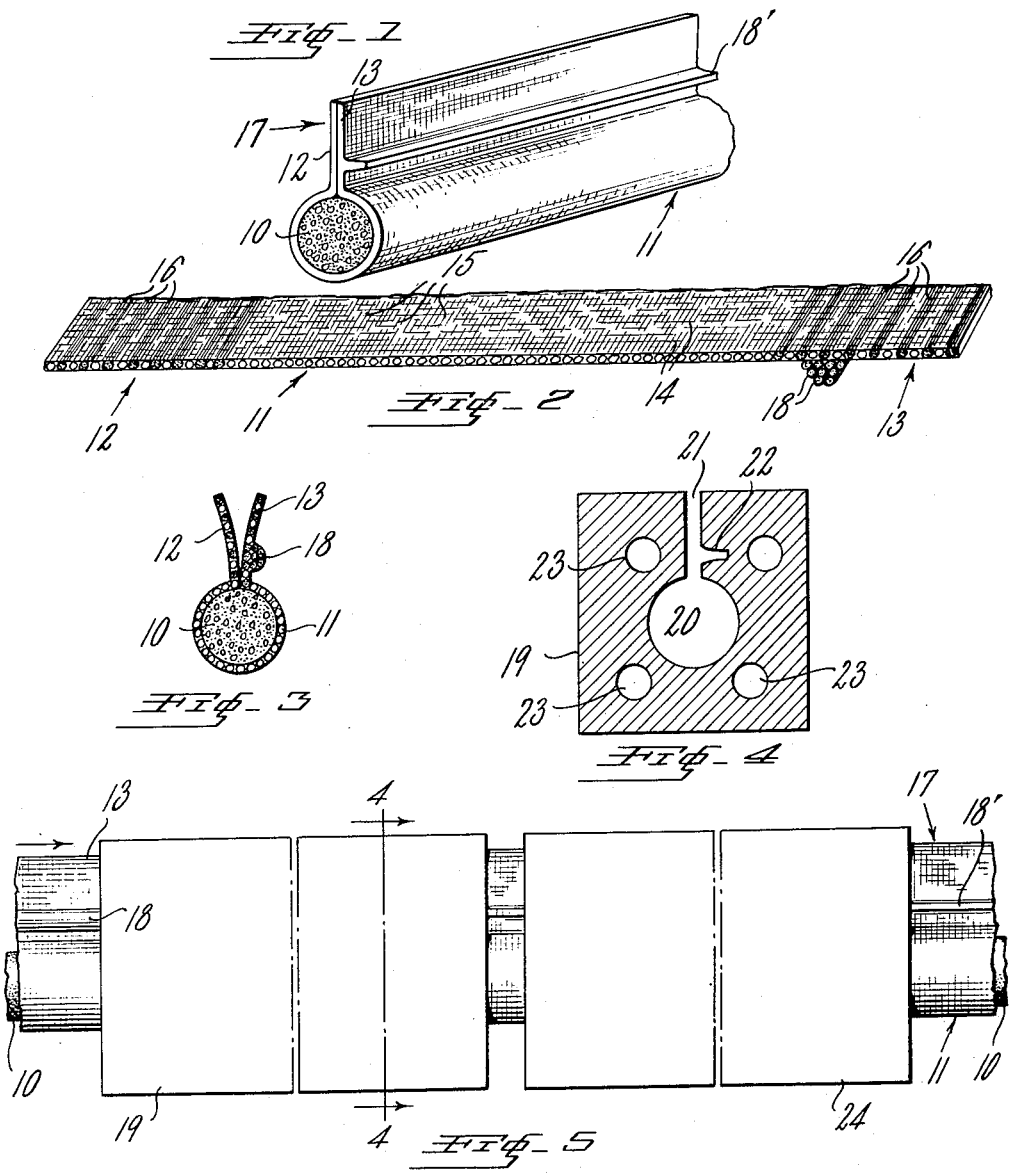
INVENTOR.
ERNEST OWENS
BY 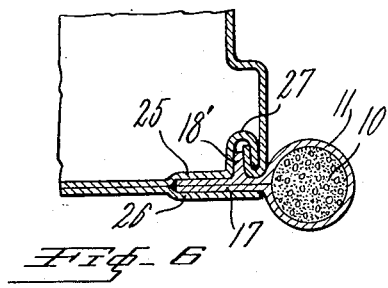
ATTORNEY United States Patent Office 2,760,897
Patented Aug. 28, 1956

2,760,897

WEATHER STRIP AND METHOD OF MAKING THE SAME

Ernest Owens, Naugatuck, Conn., assignor to United States Rubber Company, New York, N. Y., a corporation of New Jersey Application June 2, 1952, Serial No. 291,242

4 Claims. (Cl. 154—84)

This invention relates to weather strip and more particularly to the type thereof commonly known as windlace used as trim in automobiles, and to a method of making the same.

Windlace or weather strip as commonly used heretofore for trim in automobiles has been made of a core of resilient material, such as a rubber tube or a round strip of blown rubber which is enclosed in a cover strip of textile fabric that surrounds the core, and has marginal portions projecting outwardly from the core to form an anchoring flange. It has been customary heretofore to sew these two marginal portions together or adhesively secure them together so as to secure the cover strip about the core and cause these marginal portions to form an anchoring flange that extends laterally from the core. This anchoring flange is usually stiffened with adhesive or other stiffening material, so that it will retain the core portion of the weather strip in the desired position, when such windlace is installed in a vehicle.

Large quantities of windlace are used in automobiles, and it is therefore important to manufacture this material as cheaply as is consistent with the production of a durable material of pleasing appearance.

Having in mind the foregoing, the present invention contemplates an improved windlace construction whereby the procedure for securing a cover strip of textile fabric about the core of resilient material is simplified, and the marginal portions of such cover strip can be easily bonded together to form an anchoring flange having the desired stiffness. The present invention also contemplates a construction whereby the anchoring flange, just mentioned, can be readily provided with an angularly shaped anchoring rib that projects laterally therefrom and helps to secure the windlace in place.

These and other features of the present invention will be further understood from the following description when read in connection with the accompanying drawing; wherein, Fig. 1 is a perspective view of a short length of windlace or weather strip constructed in accordance with the present invention;

Fig. 2 is a perspective transverse sectional view of a piece of woven fabric constructed in accordance with the present invention to form the cover strip for a core of resilient material;

Fig. 3 is a transverse sectional view showing a core of resilient material with the covering strip of Fig. 2 placed about such core but not secured thereto;

Fig. 4 is a sectional view taken on the line 4—4 of Fig. 5 through a heating die provided to receive the construction of Fig. 3 and heat seal the cover strip about the core;

Fig. 5 is a side elevation of a heated die and a cooled die disposed in alignment for the passage of the material of Fig. 3 therethrough in the direction indicated by the arrow; and Fig. 6 is a sectional view showing the windlace of Fig. 1 installed in an automobile.

In carrying out the present invention the core of the windlace can be formed of various resilient materials, and is herein shown as a round strip 10 of cellular rubber. The present invention is not particularly concerned with the construction of this core, but is directed to the cover strip having the general construction shown in Fig. 2, and to the method of securing it about the core.

This cover strip may be formed as a ribbon or tape woven on a narrow-ware loom, or it can be woven on a wide loom and cut into narrow sttrips each having the construction of Fig. 2 to form a cover strip for a core 10, so that this cover strip can be eeasily secured about such core to form the weather strip or windlace shown in Fig. 1. The piece of woven fabric of Fig. 2 comprises a central body portion 11 that is wide enough to encircle the core 10 and has the marginal border portions 12 and 13 which are adapted to be secured together to form an anchoring flange for the windlace.

The body portion 11 may be formed of various materials such as interwoven cotton weft yarns 14 and cotton warp yarns 15, and the weft yarns 14 preferably extend across the border portions 12 and 13. Each border portion may have some of the warp yarns 15 therein, but it is important that they also have woven therein some thermoplastic warp threads 16, so that when the cover strip of Fig. 2 is placed around the core 10 as shown in Fig. 3, and the marginal portions 12 and 13 are subjected to heat and pressure, these thermoplastic threads will serve to firmly bond the marginal portions 12 and 13 together to form a relatively sttiff anchoring flange 17.

In some windlace constructions it is desirable to provide the anchoring flange with a laterally extending rib that helps to secure the windlace in place in an automobile. This rib has been provided heretofore by sewing a narrow strip of plastic material to one face of the anchoring flange. The present invention contemplates a construction whereby such an anchoring rib can be easily and quickly provided so that it has the desired shape and is firmly secured to the anchoring flange. This is accomplished in accordance with the present invention by weaving in one of the marginal portions of the fabric of Fig. 2 a group of thermoplastic warp threads such as indicated by 18, so that under the application of heat and pressure this group of threads can be molded into an angularly shaped anchoring rib having the configuration indicated by 18' in Fig. 1 of the drawing. The thermoplastic threads or filaments 16 and 18 may be made from polyvinyl chloride, copolymers of vinyl chloride and vinyl acetate, polyvinylidene chloride, copolymers of acrylonitrile and vinyl chloride, polyethylene, or of other thermoplastic materials which have a softening point that is preferably below 350° F., to permit fusion at a temperature that is not high enough to injure the other textile threads of the cover fabric.

The weather strip or windlace contemplated by the present invention is easy and inexpensive to manufacture, for after a cover strip is produced, as above described and as shown in Fig. 2, all that is necessary is to place it around the core 10 as shown in Fig. 3, and then apply sufficient heat and pressure to the marginal borders 12 and 13 to soften the thermoplastitc threads 16 so that they will bond these two borders firmly together, and impart to them the desired stiffness when they are allowed to cool.

It is desirable to secure the cover strip about the core and bond the parts 12 and 13 together as a continuous operation. To this end the cover strip of Fig. 2 is placed around the core 10 substantially as shown in Fig. 3 as the core and cover strip advance in the direction of their length. This construction of Fig. 3 is then advanced through a heating die 19 the length of which will depend upon the amount of plastic to be softened and upon its softening point. This die is provided with the cylindrical opening 20 adapted to receive the core 10 and surrounding portion 11 of the cover. The marginal border portions 12 and 13 will lie in the slot 21 of this die and the ribbed forming portion 18 will enter the lateral recess 22 of this die. The die may be maintained at the desired temperature by heating it electrically or by circulating a heating medium such as steam through the passages 23. The entrance of the die at the left hand end of the die member 19 shown in Fig. 5 should flare outwardly to some extent so as to facilitate the passage of the windlace threrethrough while it is being heated sufficiently to soften the thermoplastic threads 16 and 18, so that as the windlace advances through the die member 19 it will assume the configuration shown in Figs. 5 and 1. It is desirable to maintain die pressure upon the windlace until the thermoplastic material has cooled below its softening point. Therefore the windlace upon leaving the die member 19 preferably passes immediately into the cooling die member 24 which has substantially the same shape die passage therethrough as shown in Fig. 4, so that as the cooled windlace issues from the right hand end thereof, the thermoplastic material supplied by the threads 16 and 18 will be accurately molded to the shape shown in Fig. 1. In the finished construction of Fig. 1 the anchoring flange 17 is relatively stiff and has the angular shaped rib 18' firmly bonded thereto, by its engagement with the yarns of the fabric and by the bond between the thermoplastic material supplied by the threads 16 and 18.

When the windlace such as shown in Fig. 1 is to be installed in an automobile it can be secured in place by driving tacks through the anchoring flange 17, but in some automobiles this is not necessary, as the windlace can be secured in place by forcing it into the position in which it is shown in Fig. 6, wherein it will be seen that the flange portion 17 lies between the automobile structure 25 and the trim panel 26, with the anchoring rib 18' in a recess 27 that is frequently provided around the door frame of automobiles.

It will be seen from the foregoing that through the present invention windlace having a well formed anchoring flange and an accurately shaped anchoring rib projecting therefrom can be readily produced at high speeds and at low cost. In some constructions the anchoring rib 18' may not be desired, in which case the bunch of thermoplastic yarns 18 will be omitted, and the dies 19 and 24 will not have the molding recess 22. If desired the covering fabric 11 may be placed about a core 10 of unvulcanized rubber, in which case the heat of the die 19 may serve to cure the rubber core and also cause the portion 14 of such cover to bond firmly to the core as it is cured.

Having thus described my invention, what I claim and desire to protect by Letters Patent is:

1. The method of manufacturing weather strip, which comprises the steps of providing a core of resilient material and a cover strip of woven fabric, said cover strip having a body portion wide enough to encircle the core and two marginal borders adapted to form an anchoring flange for the weather strip, each border having woven therein thermoplastic threads and one border also having woven therein a bunch of thermoplastic threads extending along the strip to form a raised rib, passing said borders through a heated die having a restricted opening therein and an opening therein adapted to receive the thermosplastic threads extending along the strip to soften the thermoplastic threads in the borders and bond the borders together and to mold the thermoplastic threads extending along the strip into a rib, and cooling the united borders while maintaining pressure thereon.

2. The method of claim 1 wherein the borders are cooled by passing the weather strip through a cooling die having substantially the same configuration as the heating die.

3. The method of manufacturing weather strip, which includes the steps of providing a core of resilient material and a cover strip of woven fabric, said cover strip having a body portion wide enough to encircle the core and two marginal borders adapted to form an anchoring flange for the weather strip and each border having woven therein thermoplastic threads, placing the fabric around the core with the borders projecting therefrom, then heating these borders to soften the threads and pressing the borders together to cause the softened threads to bond the borders together by passing the borders continuously through a heated die, and maintaining pressure on these united borders while they cool.

4. The method of manufacturing weather strip, which includes the steps of providing a core of resilient material and a cover strip of woven fabric, said cover strip having a body portion wide enough to encircle the core and two marginal borders adapted to form an anchoring flange for the weather strip and each border having woven therein thermoplastic threads and one border also having woven therein a bunch of thermoplastic threads extending along the strip to form a raised rib, heating said borders to soften the thermoplastic threads and pressing said borders together and molding said threads forming a raised rib to bond the borders together and to mold the thermoplastic threads extending along the strip into an anchoring rib, and cooling the united borders while maintaining pressure thereon.

References Cited in the file of this patent

UNITED STATES PATENTS

| 1,742,195 | Bosley | Jan. 7, 1930 |
| 1,939,878 | Davidson | Dec. 19, 1933 |
| 1,958,131 | Davidson | May 8, 1934 |
| 2,004,413 | Main | June 11, 1935 |
| 2,204,622 | Reid | June 18, 1940 |
| 2,294,518 | Sperber | Sept. 1, 1942 |
| 2,459,120 | Sparagen | Jan. 11, 1949 |
| 2,475,241 | Hermanson | July 5, 1949 |
| 2,521,984 | Lang | Sept. 12, 1950 |